United States Patent [19]

Braswell

[11] Patent Number: 4,857,919
[45] Date of Patent: Aug. 15, 1989

[54] METHOD AND APPARATUS FOR INDICATING THE POSITION OF A CORE MEMBER OF A VARIABLE DIFFERENTIAL TRANSFORMER

[75] Inventor: Frank M. Braswell, Broken Arrow, Okla.

[73] Assignee: Conoco Inc., Ponca City, Okla.

[21] Appl. No.: 95,704

[22] Filed: Sep. 14, 1987

[51] Int. Cl.[4] ............................................. G08C 19/06
[52] U.S. Cl. .............................. 340/870.36; 324/208; 341/112
[58] Field of Search ..................... 340/347 SY, 870.36; 324/208; 328/5; 33/179.5 B

[56] References Cited

U.S. PATENT DOCUMENTS

| | | | |
|---|---|---|---|
| 3,891,918 | 6/1975 | Ellis | 324/34 D |
| 4,140,998 | 2/1979 | Bettle | 340/199 |
| 4,282,485 | 8/1981 | Pauwels et al. | 324/208 |
| 4,297,698 | 10/1981 | Pauwels et al. | 340/870.32 |
| 4,321,753 | 3/1982 | Fusari | 33/179.5 B |
| 4,450,443 | 5/1984 | Dolland | 340/870.36 |
| 4,467,320 | 8/1984 | McPhee | 340/347 SY |
| 4,514,689 | 4/1985 | Gerard | 340/870.36 |
| 4,591,795 | 5/1986 | McCorkle | 340/870.36 |
| 4,599,560 | 7/1986 | Sanford et al. | 340/870.36 |
| 4,651,130 | 3/1987 | Pennell | 340/347 SY |

Primary Examiner—Gerald Brigance
Assistant Examiner—Richard Hjerpe

[57] ABSTRACT

Method and apparatus for indicating the position of a core member of a linear variable differential transformer having a primary coil and a secondary coil. A square pulse is applied to the primary coil. The secondary coil is sampled a predetermined time after applying the square pulse. In one embodiment a periodic square wave signal is applied to the primary and the secondary is periodically sampled.

25 Claims, 3 Drawing Sheets

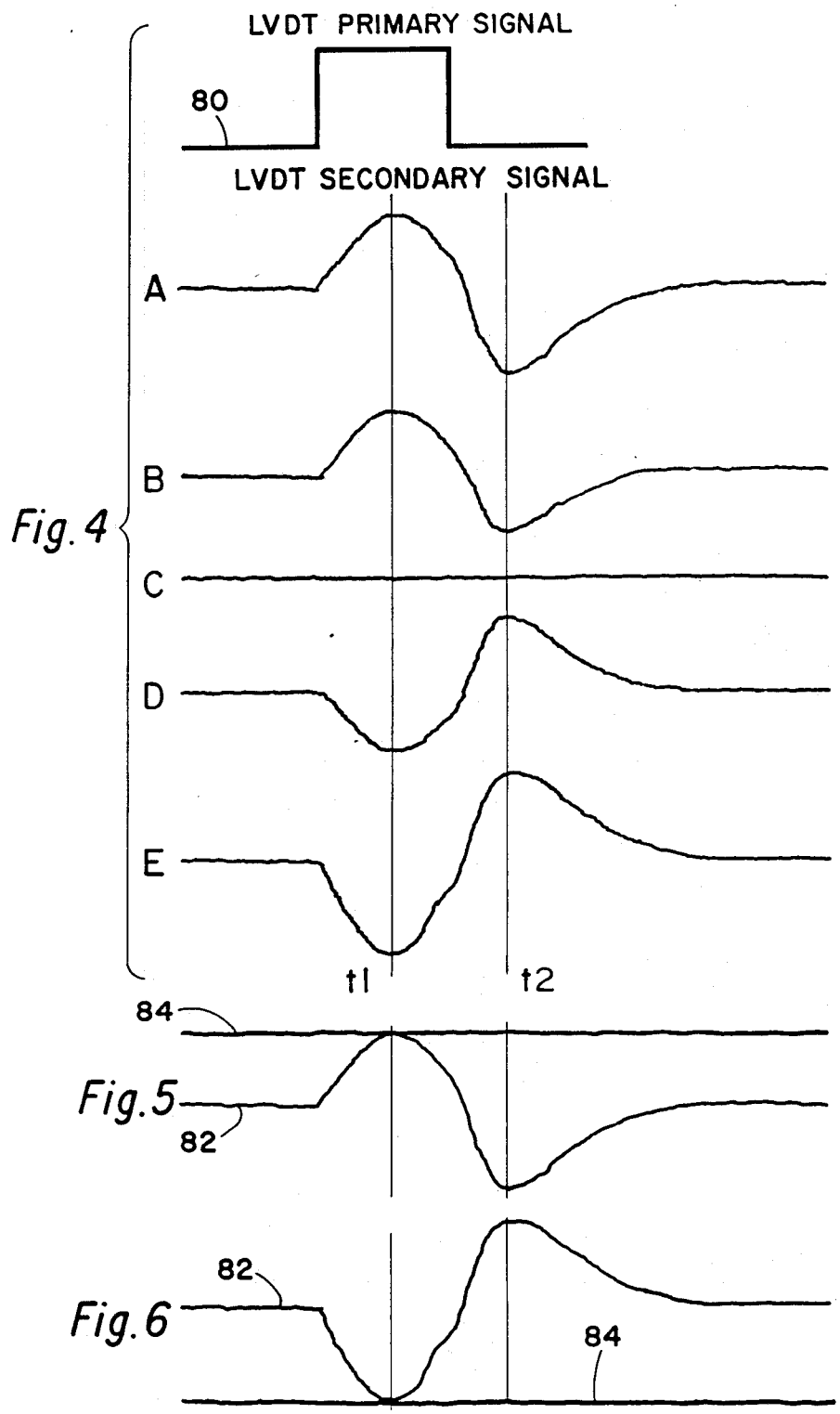

METHOD AND APPARATUS FOR INDICATING THE POSITION OF A CORE MEMBER OF A VARIABLE DIFFERENTIAL TRANSFORMER

BACKGROUND OF THE INVENTION

1. Field of the Invention

The present invention relates to methods and apparatus for indicating the position of a core member of a variable differential transformer and more particularly to such methods and apparatus in which a signal is applied to the transformer primary and the secondary signal is analyzed to determine the core position.

2. Setting of the Invention

Variable differential transformers may be used to detect the position of a moving element of interest. A linear variable differential transformer is used to detect linear position and a rotary variable differential transformer is used to detect rotary position.

A linear variable differential transformer includes a primary winding and one or more secondary windings. When the movable transformer core is centered or in a null position, there is substantially a zero output on the secondary when a sinusoidal voltage is applied to the primary. When the core is moved in one position away from the null point the voltage on the secondary increases proportional to core displacement with the secondary signal being in phase with the primary signal. When the core is moved from the null position in the other direction, the secondary voltage again increases proportional to displacement; however, the signal is 180° out of phase with the primary signal. Thus, the secondary signal includes information from which the position of the transformer core can be determined.

When the core is connected to an element, for example, a rapidly vibrating piece of machinery or a valve which is rapidly actuated, positional information of interest may be determined by demodulating the secondary signal of the linear variable differential transformer.

Prior art systems uniformly apply analog signals to the primary input. Some such circuits simply filter out the AC component of the secondary signal to generate an analog signal proportional to core position. Such heavy filtering removes information which could be used to more accurately detect transformer core position.

Other prior art circuits use the alternating current primary signal to trigger a sample and hold circut which periodically detects the value on the transformer secondary coil. Such circuits use zero-cross detection of the primary signal in order to generate a periodic signal which initiates sampling of the secondary signal. Compared to digital triggering on the edges of a digital wave form, analog zero-cross detection circuits cannot repeatably locate the point at which the primary wave form passes through zero This problem induces significant error when dealing with low frequency primary wave forms.

SUMMARY OF THE INVENTION

The instant invention comprises a method for indicating the position of a core member of a variable differential transformer having a primary coil and a secondary coil. A substantially step signal is applied to the primary coil. A predetermined time thereafter, the signal value on the secondary coil is detected. Apparatus is provided for performing the steps of the method.

Numerous advantages of the method and apparatus of the instant invention will be apparent to a person having ordinary skill in the art to which the invention relates when the following detailed description is read in view of the accompanying drawings.

BRIEF DESCRIPTION OF THE DRAWINGS

FIG. 4 is a schematic depiction of signals generated by the embodiment of FIG. 3.

FIG. 5 is a depiction of signals which may be used to calibrate the embodiment of FIG. 3.

FIG. 6 is a depiction of signals which may be used to calibrate FIG. 3.

DETAILED DESCRIPTION OF THE PREFERRED EMBODIMENTS OF THE INVENTION

Figure 1:
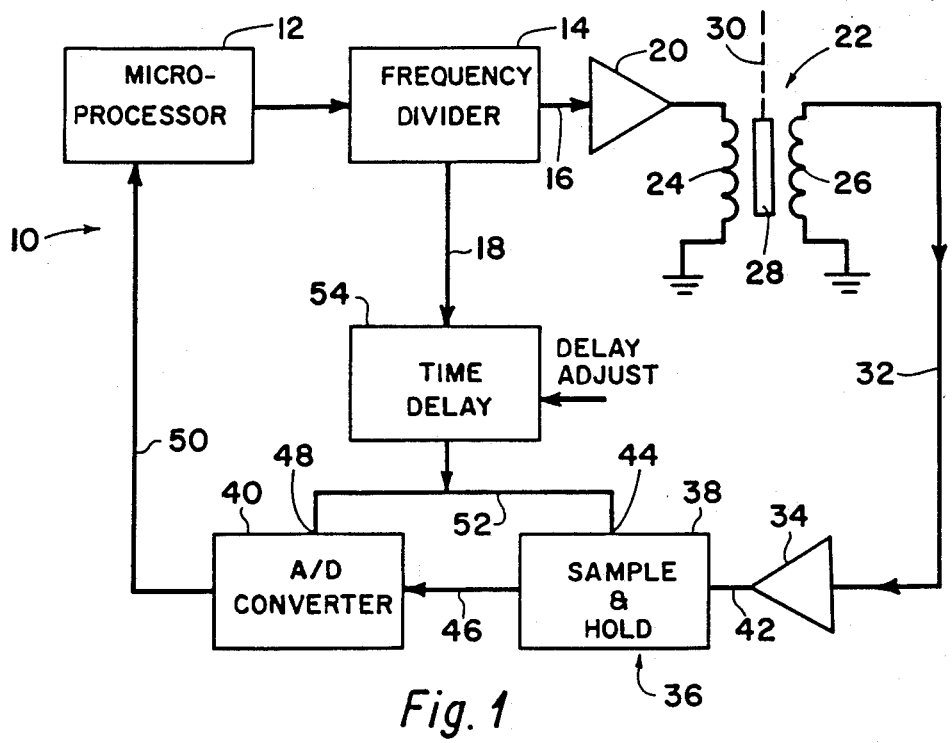
FIG. 1 is a schematic diagram of a first embodiment of the apparatus in the instant invention.

Turning now to FIG. 1, indicated generally at 10 is a circuit constructed in accordance with the apparatus of the instant invention. Circuit 10 includes a commercially available micro-processor 12 and an associated memory (not shown).

The microprocessor is connected as shown to a commercially available frequency divider 14. In the instant embodiment of the invention, frequency divider 14 has as an input a high frequency clock signal generated by microprocessor 12. This frequency is divided and an output square wave of 4,000 hertz is applied to conductors 16, 18. It is to be appreciated that the instant invention can be implemented using frequencies higher or lower than 4,000 hertz. The signal on conductor 16 is applied to the input of a commercially available amplifier 20 which has the output thereof connected to a linear variable differential transformer (LVDT) 22. LVDT 22 includes a primary coil 24 and a secondary coil 26. The output of amplifier 20 is applied across primary coil 24. A linearly movable core 28 is received between the primary and secondary coils. Core 28 is movable along an axis which is designated by dashed line 30. Although not shown in FIG. 1, the core is fixedly connected to a movable element of interest. As will later be more fully explained, signals generated by the LVDT secondary coil are related to the position of core 28 and thus to the position of the element to which the core is attached.

The output of secondary coil 26 is applied via conductor 32 to a second amplifier 34. The output of amplifier 34 is connected to what is referred to herein as means for periodically detecting the signal value appearing on the secondary coil, such being indicated generally at 36. Included therein is a commercially available sample-and-hold circuit 38 and a commercially available analog-to-digital converter 40. Sample-and-hold circuit 38 monitors the analog value of the signal appearing on the input to circuit 38, such being connected to conductor 42. When a signal is applied to a hold terminal 44 of circuit 38, the value of the signal on conductor 42 appears on conductor 46, which is connected to the output of circuit 38. The value on conductor 46 is maintained thereon for a preselected period even after the signal value on conductor 42 changes.

Analog-to-digital converter 40 has the signal appearing on conductor 46 applied to the input thereof. In response to a signal appearing on terminal 48 of converter 40, the converter generates a digital signal proportional to the value of the analog signal appearing on conductor 46 and applies the same to a bus 50 which is connected to an input port of microprocessor 12. Thus, in response to a signal appearing on a conductor 52, which is electrically connected to terminal 44 on sample-and-hold circuit 38 and to terminal 48 on analog-to-digital converter 40, the magnitude of the analog signal appearing on conductor 42 at the time a signal appears on conductor 52 is sampled and applied to conductor 46. Thereafter, the converter generates a digital value proportional to the magnitude of the value appearing on conductor 46 and transmits the same to microprocessor 12 via bus 50.

A commercially available time delay circuit 54 includes an input which is electrically connected to conductor 18 and an output which is electrically connected to conductor 52. In response to a signal appearing on conductor 18, the time delay circuit produces a signal on conductor 52 a predetermined time after the appearance of a signal on conductor 18. As indicated in the drawing, the amount of delay is adjustable. Time delay 54 can also be set to produce such delayed signals on conductor 52 in response to a low-to-high transition, a high-to-low transition or to both.

Figure 2:
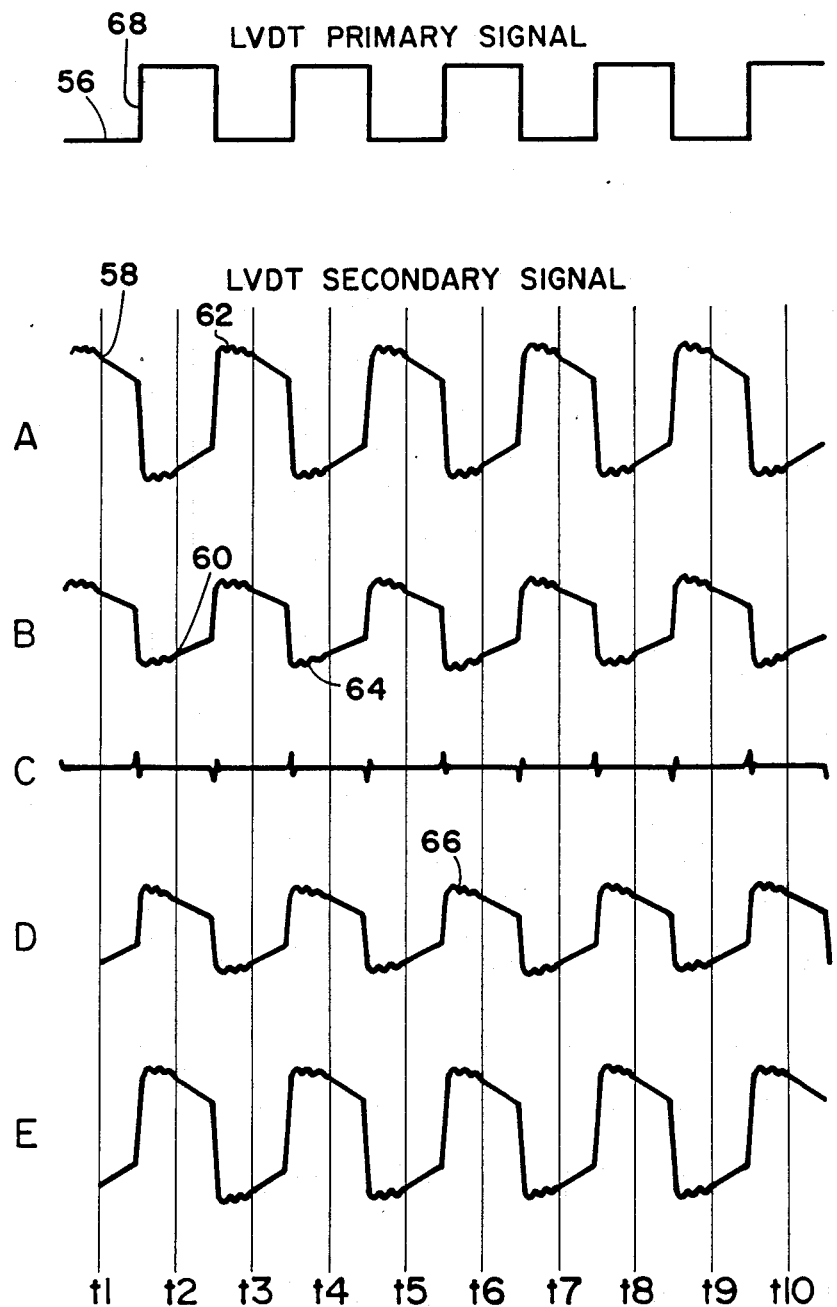
FIG. 2 is a schematic depiction of signals generated by the embodiment of FIG. 1.

Turning now to FIG. 2, consideration will be given to the operation of circuit 10 and particularly to certain signals generated by the circuit. An LVDT primary signal 56, which as will be recalled for circuit 10 is a 4,000 hertz signal, is applied across primary core 24 of the LVDT. Signals A, B, C, D, E are each depictions of the signal which appears across secondary coil 26 of the LVDT with each signal being produced as a result of a different position of core 28 of the transformer. For example, signal C is produced when core 28 is in the position shown in FIG. 1, i.e., its null or center position. As the core is linearly displaced upwardly along axis 30, the amplitude of the signal appearing thereon increases and at some point appears as signal B. When core 28 is displaced along axis 30 at its uppermost position, the signal on secondary 26 appears as signal A in FIG. 2. As shown in FIG. 2, when the core is displaced upwardly, the signals appearing on the secondary of the transformer are 180° out of phase with the primary square wave signal.

Signal D illustrates the magnitude and phase of the signal when core 28 is displaced a certain amount below its null position along axis 30 while signal E is illustrative of the magnitude of the signal at the core's lowermost position. For all core positions below that shown in FIG. 1, the phase of the secondary signal is in phase with the primary square wave signal.

The vertical lines in FIG. 2 designated t1, t2, t3, etc., represent sampling times for each of the secondary signals depicted in FIG. 2. The sampling times, as will later be more fully explained, are selected for a particular setting of the delay adjustment in time delay circuit 54. Point 58 on signal A will be designated as point $A_{t1}$. This means of designating a particular point on one of the signals will be used for each of the other signals and sample points, e.g., point 60 may be designated as point $B_{t2}$.

It should be noted that after transition of the primary signal from low to high or high to low, ringing occurs in each of the secondary signal wave forms in FIG. 2. The ringing is reflected in the signal values on the secondary by ripples, such as ripples 62, 64, 66, etc. which appear after each transition. Such is the expected result of applying a high frequency signal, such as signal 56, to the primary of a transformer, such as transformer 22.

In the example of FIG. 2, the time delay in time delay circuit 54 is set for the time between the transition edge of the square wave signal 56 and the time at which the following time sample occurs, i.e., the time delay is equal to the time between edge 68 and point $A_{t2}$. It can be seen that as edge 68 generates a downward transition in signal A, square wave 56 is applied to conductor 18 thus triggering the time delay. After the elapsed time, a signal is applied to conductor 52 thereby causing sample-and-hold circuit 38 to hold the value of point $A_{t2}$ on conductor 46.

Thereafter, converter 40 converts the same to a digital value, applies that value to bus 50 and transmits the same to microprocessor 12. It can be seen that, e.g., in signal A, the following values may be sampled, converted to digital form and transmitted to microprocessor 12: points $A_{t1}$, $A_{t2}$, $A_{t3}$, etc. It should be remembered that as the position of the core changes, the magnitude of the secondary signal changes in direct relation thereto. Thus, the sample values provide an indication of the position of core 28 and the element to which it is attached.

The samples which microprocessor 12 considers in determining core position may include each sample taken immediately after, e.g., the rising edge of the secondary wave form. Such samples include, considering signal D as an example: points $D_{t2}$, $D_{t4}$, $D_{t6}$, etc. Continuously monitoring the magnitude of such signals provides indication of the position of the core. Time delay 54 may be set to so sample the secondary.

Alternatively, points $D_{t1}$, $D_{t3}$, $D_{t5}$ could be sampled to determine the same information since these points are mirror images (due to the phase relationship) of points $D_{t2}$, $D_{t4}$, $D_{t6}$, etc. Time delay 54 may be so set to sample the secondary.

Another technique which samples the secondary signal after each transition may be utilized. This technique involves computation of the difference between successive points. For example, the first sampled value equals point $E_{t2}$ minus point $E_{t1}$, the second value equals point $E_{t4}$ minus point $E_{t3}$, the third value equals point $E_{t6}$ minus point $E_{t5}$, etc. This method has the advantage of slightly better amplitude resolution. Also, it eliminates any direct current offset imposed by gain amplifier 34. It does, however, require more sampling and requires the microprocessor to perform the subtraction operations after the digital sample values are transmitted thereto.

It is desirable to sample near the peak or valley of the secondary wave form in order to utilize the maximum range of analog-to-digital converter 40. However, sampling in the ringing portion of the signal is to be avoided in order to maintain accuracy. Thus, the sampling is set as shown in FIG. 2, i.e., immediately as possible after the occurrence of the ringing, by adjusting the time delay in time delay circuit 54.

Figure 3:
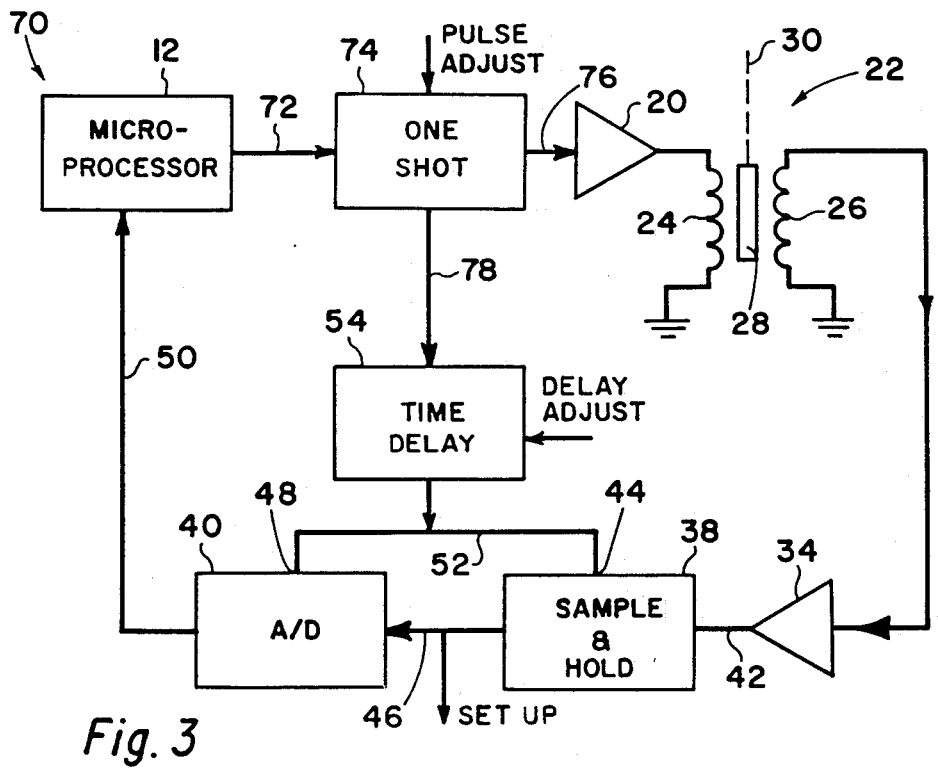
FIG. 3 is a schematic diagram of a second embodiment of the apparatus in the instant invention.

Directing attention to FIG. 3, consideration will be given to a circuit 70 which comprises a second embodiment of the invention. Several of the components of circuit 70 are the same as for circuit 10 in FIG. 1 and have been correspondingly numbered in FIG. 3. In circuit 70, an output of microprocessor 12 is applied to a conductor 72; however, the output does not comprise the microprocessor clock frequency as in circuit 10 but rather comprises a computer demand signal which, as will later be more fully explained, initiates a single sample of the wave form appearing on secondary 26. Conductor 72 is connected to the input of a one-shot multivibrator circuit 74. Circuit 74 operates in the usual manner. In response to a signal appearing on conductor 72, a single pulse appears on the output of the one-shot circuit which is applied to conductors 76, 78. As indicated in the drawing, the width of the pulse generated in response to a signal on conductor 72 is adjustable.

Turning now to FIG. 4, consideration will be given to the operation of circuit 70 and to some of the signals generated thereby. A signal 80 comprises a substantially step signal or square pulse which is generated by one-shot circuit 74, amplified by amplifier 20 and applied to primary 24 of LVDT 22. As in the signals shown in FIG. 2 which are generated by circuit 10, signals A, B, C, D, E in FIG. 4 are all signals which appear on secondary coil 26 of the transformer in response to signal 80 depending upon the position of transformer core 28. For example, signals A, B, being in phase with signal 80 represent positions of core 28 shifted downwardly from the null or zero position (which causes signal C in FIG. 4 to be generated). Likewise, signals D, E represent signals produced on the secondary when core 28 is shifted upwardly with the higher magnitude signal, signal E, representing the uppermost position of the core.

The pulse width adjustment on one-shot circuit 74 needs to be adjusted so that the peak on the secondary appearing in response to signal 80 appears prior to the trailing edge of signal 80. If the secondary signal had not peaked before the trailing edge of signal 80, the secondary signal would be prevented from reaching its true undistorted peak. As in the case of circuit 10, sampling may occur following a rising edge of the primary signal, i.e., sampling at t1, or following a trailing edge, i.e., sampling at t2.

In the embodiment of circuit 70, the analog value of the sample taken on the secondary, which appears on conductor 46, can be used to set up or calibrate the delay adjust in time delay 54. The signal on conductor 46, which is connected to a terminal labeled "set up" in FIG. 3, is applied to an oscilloscope along with the wave form appearing on secondary coil 26 of the transformer. In FIG. 5, signal 82 (which is similar to signal A in FIG. 4) represents a downward shift of core 28 of the transformer while signal 84 is the value appearing on conductor 46, i.e., the converted and held value. It can be seen that adjusting the time delay adjusts the time after the leading or trailing edge of signal 80 at which the secondary is sampled. FIG. 5 illustrates that the time delay is set equal to the time between the leading edge of signal 80 and t1. It can be seen that changing the value of the time delay changes the analog value of signal 84. If the time delay is shortened, signal 84 in FIG. 5 drops relative to signal 82 because the sample is occurring along the rising edge of signal 82, i.e., the sample time indicated by t1 in FIG. 4, moves to the left. Also, if time delay is lengthened, signal 84 drops relative to signal 82 because the sample occurs on the downward slope of the first pulse of signal 82. The relative positions of signals 82, 84 in FIG. 5 is the ideal calibration because it is desirable to sample in an area of relatively low slope, i.e., rate of signal change, to minimize error. It is also desirable to sample near the peak of a signal in order to use the fullest possible range of converter 40 thereby increasing accuracy.

It should be noted that sampling may occur at t2, i.e., after the trailing edge of signal 80. In such a case signal 84 drops to the value of signal 82 at t2. The signals shown in FIG. 5 are displayed on an oscilloscope in order to select the exact sampling point along the secondary, preferably either at a peak or valley as described.

Between the sample illustrated in FIG. 5 and the sample illustrated in FIG. 6, the core of the transformer has been shifted to its other extreme thereby producing a negative pulse with sampling occurring at the valley of the pulse which, as can be seen, is located at t1 after the leading edge of signal 80.

The instant invention comprises an exact method for modulating and demodulating a variable differential transformer in which accurate information is retrieved by sampling the secondary. The instant invention accomodates itself nicely to digital systems in view of the use of digital wave forms as described. The accuracy of circuits constructed in accordance with the instant invention is high due to the accuracy inherent in timing from leading and trailing edges of a substantially square wave, i.e., digital signals.

It is to be appreciated that additions and modifications may be made to the instant embodiment of the invention without departing from the spirit thereof which is defined in the following claims.

I claim:

1. A method for indicating the position of a core member of a variable differential transformer having a primary coil and a secondary coil, said method comprising the steps of:
   applying a substantially step signal to the primary coil;
   sampling an induced signal from the secondary coil at a preselected time after applying said step holding the induced signal value; and
   converting the induced signal value to a digital signal indicating position of said core member.

2. The method of claim 1 wherein the step of applying a substantially step signal to the primary coil comprises the step of applying a substantially square pulse to the primary coil.

3. The method of claim 2 wherein the step of sampling the induced signal comprises the step of waiting until after the occurrence of the leading edge of said square pulse and before the occurrence of the trailing edge of said square pulse.

4. The method of claim 3 wherein said method further includes the step of adjusting the length of said preselected time until the induced signal value on said secondary coil is substantially equal to the maximum signal value on said secondary coil.

5. The method of claim 2 wherein the step of sampling the induced signal comprises the step of waiting until after the occurrence of the trailing edge of said square pulse.

6. The method of claim 5 wherein includes the step of adjusting the length of said preselected time until the induced signal value on said secondary coil is substantially equal to the minimum signal value on said secondary coil.

7. The method of claim 3 wherein said method further comprises the step of:

waiting a second preselected time after applying said step signal;

again sampling and holding a second signal value of said secondary coil induced signal; and determining the difference between the first induced signal value and said second signal value.

8. The method of claim 7 wherein the step of waiting a second preselected time after applying said step signal comprises the step of waiting until after the occurrence of the trailing edge of said square pulse.

9. The method of claim 2 wherein the step of sampling the induced signal from said secondary coil comprises the step of sampling the signal value said secondary coil a preselected time after the occurrence of each falling edge in the square wave signal and before the occurrence of the next rising edge.

10. The method of claim 9 wherein said method further includes the step of adjusting the length of said preselected time until the sampled signal value on said secondary coil is near a valley of said sampled signal.

11. The method of claim 2 wherein the step of sampling the induced signal from said secondary coil comprises the step of sampling the signal value on said secondary coil a preselected time after the occurrence of each rising edge in the square wave signal and before the occurrence of the next falling edge.

12. The method of claim 11 wherein said method further includes the step of adjusting the length of said preselected time until the sampled signal value on said secondary coil is near a peak of said sampled signal.

13. The method of claim 10 wherein said method further includes the steps of:

detecting the induced signal value on said secondary coil a preselected time after the occurrence of each falling edge in the square wave signal and before the occurrence of the next rising edge;

calculating the difference between the induced value detected after the occurrence of each rising edge of the square wave signal and the induced signal value detected after the occurrence of the next falling edge.

14. A method for indicating the position of a core member of a variable differential transformer having a primary coil and a secondary coil, said method comprising the steps of:

applying a substantially square wave signal to the primary coil; and sampling an induced signal value on the secondary coil at a rate dependent upon the frequency of the square wave signal.

15. The method of claim 14 wherein the step of sampling signal induced value on the secondary coil at a rate dependent upon the frequency of the square wave signal comprises the steps of:

detecting each rising edge of the square wave signal;

waiting a preselected time after the occurrence of each detected rising edge and before the occurrence of the next falling edge; and detecting the induced signal value on said secondary coil.

16. The method of claim 15 wherein said method further includes the steps of adjusting the length of said preselected time until the induced signal value on said secondary coil is near a peak of said induced signal.

17. The method of claim 14 wherein the step of sampling the induced signal value on the secondary coil at a rate dependent upon the frequency of the square wave signal comprises the steps of:

detecting each falling edge of said square wave signal;

waiting a preselected time after the occurrence of each detected falling edge and before the occurrence of the next rising edge; and detecting the induced signal value on said secondary coil.

18. The method of claim 17 wherein said method further includes the step of adjusting the length of said preselected time until the induced signal value on said secondary coil is near a valley of said detected signal.

19. The method of claim 17 wherein said method further includes the steps of:

detecting each rising edge of said square wave signal;

waiting a second preselected time after the occurrence of each detected rising edge and before the occurrence of the next falling edge;

detecting the induced signal value on said secondary coil; and calculating the difference between the induced signal value detected after the occurrence of each rising edge of the square wave signal and the induced signal value detected after the occurrence of the next falling edge.

20. Apparatus for indicating the position of a core member of a variable differential transformer having a primary coil and a secondary coil, said apparatus comprising:

means generating a substantially step signal, said generating means being connected- to said primary coil;

means to sample and hold an induced signal appearing on said secondary coil; and time delay means operatively interconnected between said generating means and said sample and hold means. for sampling the induced signal from the secondary coil at a preselected time after applying said step signal.

21. The apparatus of claim 20 wherein said generating means comprises means for generating a substantially square pulse.

22. The apparatus of claim 20 wherein said apparatus further includes means for generating a substantially square wave signal connected to said primary coil.

23. The apparatus of claim 22 wherein said apparatus further includes means for periodically detecting the induced signal appearing on said secondary coil.

24. Apparatus for indicating the position of a core member of a variable differential transformer having a primary coil and a secondary coil, said apparatus comprising:

means for generating a substantially square wave signal, said generating means being connected to the primary coil;

means for detecting an edge of such a square wave signal;

means for detecting a signal value appearing on said secondary coil; and time delay means operatively disposed between said generating means and said edge detecting means. for sampling the signal value appearing on said secondary coil at a preselected time after applying said square wave signal.

25. The apparatus of claim 24 wherein said apparatus further includes means for calculating the difference between signal values detected on said secondary coil.

* * * * *